(12) United States Patent
Morishita et al.

(10) Patent No.: US 8,960,363 B2
(45) Date of Patent: Feb. 24, 2015

(54) ELECTRIC POWER STEERING DEVICE

(75) Inventors: Fumihiro Morishita, Tochigi-ken (JP);
Takuji Wada, Utsunomiya (JP); Hiroaki Horii, Utsunomiya (JP); Hiroki Sagami, Utsunomiya (JP); Kyoji Hamamoto, Utsunomiya (JP); Shinji Hironaka, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 13/579,106

(22) PCT Filed: Jan. 27, 2011

(86) PCT No.: PCT/JP2011/051570
§ 371 (c)(1),
(2), (4) Date: Aug. 15, 2012

(87) PCT Pub. No.: WO2011/105154
PCT Pub. Date: Sep. 1, 2011

(65) Prior Publication Data
US 2012/0312627 A1    Dec. 13, 2012

(30) Foreign Application Priority Data

Feb. 25, 2010    (JP) .................................. 2010-040583

(51) Int. Cl.
*B62D 5/04*        (2006.01)
(52) U.S. Cl.
CPC ............ *B62D 5/0463* (2013.01); *B62D 5/0484* (2013.01); *B62D 5/049* (2013.01)
USPC .......................................... 180/446; 701/43
(58) Field of Classification Search
CPC ........ B62D 5/04; B62D 5/0457; B62D 5/046; B62D 5/0463; B62D 5/044; B62D 5/049
USPC ................ 180/443, 446; 701/41, 42, 43
See application file for complete search history.

(56) References Cited

U.S. PATENT DOCUMENTS 5,712,563 A    1/1998 Kawagoe et al.
7,506,554 B2   3/2009 Shimizu et al.
(Continued)

FOREIGN PATENT DOCUMENTS

DE          195 21 531 A1    12/1995
DE    10 2008 032 081 A1    1/2010
(Continued)

OTHER PUBLICATIONS

Japanese Office Action dated Mar. 18, 2014 issued over the Japanese Patent Application 2012-501711 with an English translation of pertinent portion.

(Continued)

*Primary Examiner* — Anne Marie Boehler
(74) *Attorney, Agent, or Firm* — Carrier Blackman & Associates, P.C.; Joseph P. Carrier; Jeffrey T. Gedeon

(57) ABSTRACT

Disclosed is an electric power steering device capable of applying a prescribed steering assist force to a steering assembly, even when a torque sensor is out of order and the electric power steering device is in a state of being unable to sense steering torque by the torque sensor. Using an angle of rotation of a rotating element, which is detected by a resolver that serves as a rotating element angle of rotation sensing unit of a motor, a steering angle and a steering angular velocity are estimated, and a prescribed steering assist force is applied to a steering assembly by the motor, on the basis of an estimated steering angle and/or an estimated steering angular velocity.

5 Claims, 10 Drawing Sheets

(56) References Cited

U.S. PATENT DOCUMENTS

| | | |
|---|---|---|
| 7,559,405 B2 * | 7/2009 | Kumaido et al. ............ 180/446 |
| 8,528,689 B2 * | 9/2013 | Uryu ............................ 180/446 |
| 2002/0120378 A1 | 8/2002 | Kawada et al. |
| 2006/0042404 A1 | 3/2006 | Shimizu et al. |

FOREIGN PATENT DOCUMENTS

| | | | |
|---|---|---|---|
| EP | 2 116 443 A1 | 11/2009 |
| JP | 6096389 B | 11/1994 |
| JP | 2830992 B2 | 12/1998 |
| JP | 11-129925 A | 5/1999 |
| JP | 3055752 B2 | 6/2000 |
| JP | 2001-106099 A | 4/2001 |
| JP | 2002-225745 A | 8/2002 |
| JP | 2003-072580 A | 3/2003 |
| JP | 2005-067262 A | 3/2005 |
| JP | 3964414 B2 | 8/2007 |
| JP | 4057552 B2 | 3/2008 |
| JP | 2008-213743 A | 9/2008 |

OTHER PUBLICATIONS

German Office Action issued Aug. 6, 2014 in the corresponding DE Patent Application 11 2011 100 682.9.

* cited by examiner

ELECTRIC POWER STEERING DEVICE

TECHNICAL FIELD

The present invention relates to an electric power steering apparatus (device) for turning a vehicle with a light steering force applied to a steering wheel by the operator, and in which the steering force applied to the steering wheel is transmitted to the road wheels through a steering system.

BACKGROUND ART

Steering forces applied to a steering wheel by the operator are detected by a torque sensor, which is mounted on a steering shaft coupled to the steering wheel. Based on the steering forces (steering torque) detected by the torque sensor, a controller of an electric power steering apparatus energizes an electric motor (hereinafter simply referred to as a "motor"). The electric power steering apparatus transmits an assistive torque generated by the motor through a worm gear speed reducer mechanism, etc., to the steering shaft (steering system) for thereby reducing the required steering forces applied to the steering wheel by the operator.

One known type of torque sensor, as disclosed in Japanese Patent No. 3055752 and Japanese Patent No. 2830992, includes a torsion bar interconnecting an input shaft and an output shaft, and a core engaging the input shaft and the output shaft. When a torque is applied between the input and output shafts, the core is displaced, and displacement of the core is detected by a detecting coil. Another known torque sensor, as disclosed in Japanese Patent No. 3964414 and Japanese Patent No. 4057552, includes magnetostrictive films disposed on a steering shaft, and detecting coils for detecting a change in the magnetic characteristics of the magnetostrictive films. Torque applied to the steering shaft is electrically detected by the detecting coils.

Japanese Patent Publication No. 06-096389 discloses a technology which, in the event of a failure of a torque sensor, cancels the assistance from the steering force generated by an electric motor and makes a steering system manually operable when the vehicle speed is higher than a prescribed speed. Further, when the vehicle speed is lower than the prescribed speed, the electric motor is controlled depending on a steering angular velocity calculated from an output signal from a steering angle sensor.

SUMMARY OF INVENTION

Heretofore, as disclosed in Japanese Patent Publication No. 06-096389, when the torque sensor for detecting the steering torque fails, the electric motor is controlled depending on a steering angular velocity calculated from an output signal from the steering angle sensor.

However, on vehicles that do not incorporate a steering angle sensor, if the torque sensor fails and hence is unable to detect the steering torque, then assistance from the steering force generated by the electric motor has to be canceled, and the steering system must be made manually operable.

The present invention has been made in view of the above problems. It is an object of the present invention to provide an electric power steering apparatus, which is capable of applying a steering assistive force generated by a motor, even if a torque sensor fails and is unable to detect the steering torque.

According to the present invention, there is provided an electric power steering apparatus including a torque detector for detecting a torque generated in a steering system, a motor for applying an assistive torque to a rotational shaft of the steering system, a rotor angular displacement detector for detecting an angular displacement of a rotor of the motor, and a motor controller for controlling an electric current for energizing the motor based on the torque detected by the torque detector, wherein the electric power steering apparatus is characterized by an abnormality detector for detecting whether or not the torque sensor has become abnormal, and if the abnormality detector detects an abnormality of the torque sensor, the motor controller controls the electric current for energizing the motor based on the angular displacement of the rotor detected by the rotor angular displacement detector.

According to the present invention, when an abnormality of the torque detector is detected, the electric current for energizing the motor, i.e., an assistive electric current, is controlled based on the angular displacement of the rotor, which is detected by the rotor angular displacement detector that serves as an indispensable component for rotational control of the motor (detection of magnetic pole positions). Therefore, even if the torque sensor fails and is unable to detect the steering torque, a steering assistive force can be generated and applied by the motor.

The electric power steering apparatus further comprises a storage unit which stores in advance a characteristic curve representative of a relationship between the angular displacement of the rotor and the electric current for energizing the motor, and a vehicle speed detector for detecting a vehicle speed of a vehicle that incorporates the electric power steering apparatus, wherein when the abnormality detector detects an abnormality of the torque detector, the motor controller obtains the electric current for energizing the motor by referring to the characteristic curve stored in the storage unit, based on the angular displacement of the rotor detected by the rotor angular displacement detector, and corrects the electric current with the vehicle speed detected by the vehicle speed detector, to thereby generate a corrected electric current for energizing the motor. Accordingly, a steering assistive force can be applied within an entire vehicle speed range in which the steering assistive force is required.

The electric power steering apparatus may further comprise a storage unit which stores an electric current limiting value depending on the vehicle speed. Thus, a steering assistive force depending on the vehicle speed can be applied, and an excessive electric current is prevented from being supplied.

The electric power steering apparatus may further comprise a steering angular velocity detector for detecting an angular velocity of the rotational shaft of the steering system, wherein the motor controller limits the electric current for energizing the motor when an absolute value of a steering angular velocity detected by the steering angular velocity detector is in the vicinity of zero at a time that a steering wheel is turned.

The steering angular velocity detector detects the angular velocity of the rotational shaft of the steering system based on an angular velocity of the rotor.

The electric power steering apparatus may further comprise a vehicle stop detector for detecting that a vehicle, which incorporates the electric power steering apparatus therein, stops, wherein the motor controller sets the electric current for energizing the motor to zero when the vehicle stop detector detects that the vehicle has stopped. Consequently, an unnecessary steering assistive force will not be applied.

According to the present invention, even if the torque sensor fails and is unable to detect the steering torque, a steering assistive force is applied by controlling the electric current for energizing the motor based on the angular displacement of the rotor, which is detected by the rotor angular displacement detector for controlling rotation of the motor.

DESCRIPTION OF EMBODIMENTS

An embodiment of the present invention will be described below with reference to the drawings.

Figure 1:
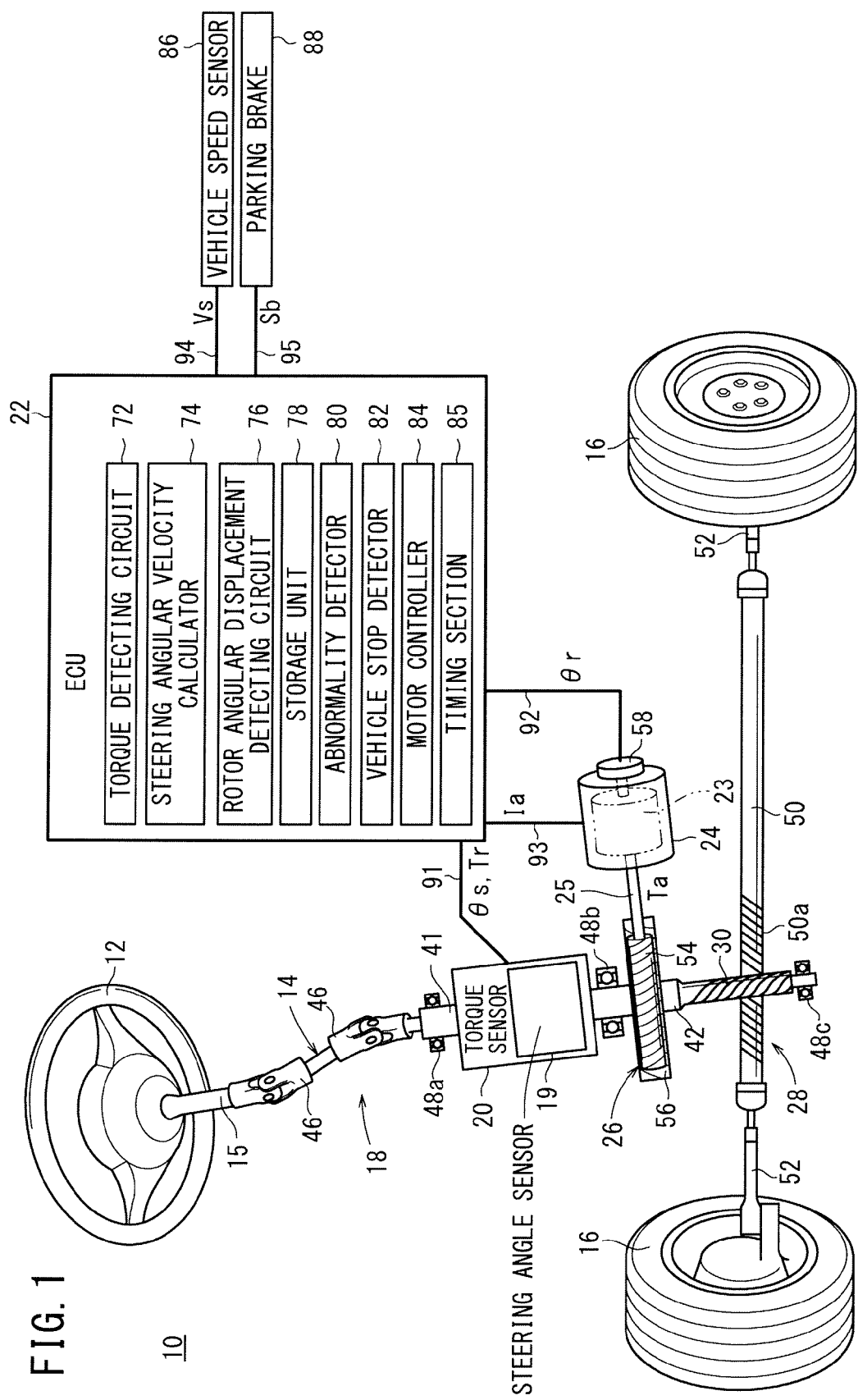
FIG. 1 is a schematic configuration view of an electric power steering apparatus according to an embodiment of the present invention.

FIG. 1 is an overall schematic view of an electric power steering apparatus 10 according to an embodiment of the present invention, which is incorporated in a vehicle.

Figure 2:
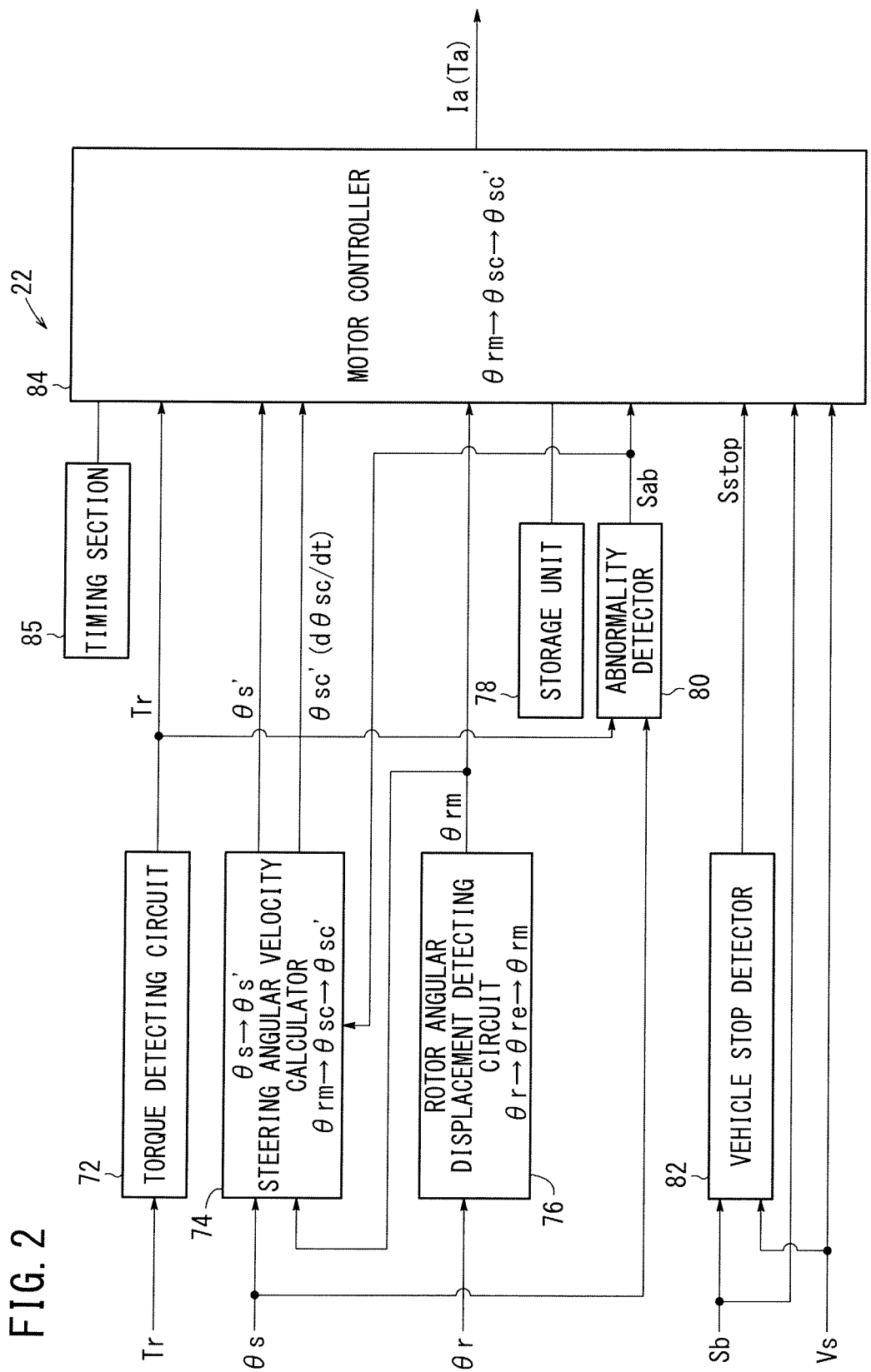
FIG. 2 is a diagram showing connections in an ECU of the electric power steering apparatus shown in FIG. 1.

FIG. 2 is a functional block diagram of an ECU (Electric Control Unit) 22 of the electric power steering apparatus 10 shown in FIG. 1.

As shown in FIG. 1, the electric power steering apparatus 10 basically includes a steering system 18 ranging from a steering wheel 12 (operating element to be operated by the driver to maneuver the vehicle), a steering shaft 14, to steerable road wheels 16, a torque sensor (also referred to as a "torque sensor and steering angle sensor") 20 disposed on a rotational shaft of the steering system 18 and including a steering angle sensor 19 therein for detecting a torque Tr and a steering angle θs of the rotational shaft, an ECU 22 for determining an assistive torque Ta based on output signals from the torque sensor 20, an electric motor (hereinafter simply referred to as a "motor") 24 as a brushless motor energizable by the ECU 22, and a speed-reducer transmitting mechanism 26 for transmitting output power from the motor 24 at a speed reduction ratio as the assistive torque Ta to the rotational shaft of the steering system 18. The motor 24 may also be a brush motor.

The torque sensor 20 is of a known structure in which an input shaft 41, which serves as the rotational shaft of the steering system 18, and an output shaft 42 are connected to each other by a torsion bar, and two detecting coils (not shown) are supported on a housing (not shown) and disposed around a hollow cylindrical core (not shown) held in engagement with the input and output shafts 41, 42 (see, for example, Japanese Patent No. 3055752 and Japanese Patent No. 2830992).

The steering angle sensor 19 is of a known structure for detecting an angular displacement of the input shaft 41 as the steering angle θs (see, for example, Japanese Patent No. 3055752).

The torque sensor 20 may be of a different known structure comprising a magnetostrictive film sensor, and which does not include a torsion bar or a hollow cylindrical core (see, for example, Japanese Patent No. 3964414 and Japanese Patent No. 4057552).

The present invention is also applicable to a torque sensor that does not include the steering angle sensor 19.

The torque Tr and the steering angle θs represented by output signals from the torque sensor 20 and the steering angle sensor 19 are supplied through a harness 91 respectively to a torque detecting circuit 72 of the ECU 22 and to a steering angular velocity calculator 74, which functions as a steering angular velocity detector of the ECU 22.

The steering shaft 14 comprises a joined assembly of rotational shafts including a main steering shaft 15 integrally coupled to the steering wheel 12, an input shaft 41 coupled to the main steering shaft 15 by a universal joint 46, and an output shaft 42 having a pinion 30 of a rack-and-pinion mechanism 28.

The input shaft 41 and the output shaft 42 are supported by respective bearings 48a, 48b, and the pinion 30 is combined with a lower end portion of the output shaft 42. The pinion 30 is held in mesh with rack teeth 50a on a rack shaft 50, which is reciprocally movable in transverse directions of the vehicle. The steerable road wheels 16, which are left and right front road wheels of the vehicle, are coupled respectively by tie rods 52 to opposite ends of the rack shaft 50.

The steering system 18 includes the steering wheel 12, the steering shaft 14 (main steering shaft 15, the universal joint 46, the input shaft 41, and the output shaft 42 including the pinion 30), the rack shaft 50 having the rack teeth 50a, the tie rods 52, and the steerable road wheels 16.

The steering system 18 of the above structure makes it possible to perform a normal rack-and-pinion steering process when the steering wheel 12 is turned. Therefore, the driver of the vehicle can change the direction of the vehicle by turning the steering wheel 12 in order to steer the steerable road wheels 16. The rack shaft 50, the rack teeth 50a, and the tie rods 52 jointly make up a steering mechanism.

As described above, the electric power steering apparatus 10 includes the motor 24 for supplying a steering assistive force (also simply referred to as an "assistive force") for reducing the steering force applied to the steering wheel 12. A worm gear 54, which is fixed to the rotational shaft of the motor 24, is held in mesh with a worm wheel gear 56 mounted at an intermediate portion of the output shaft 42 below the bearing 48b. The worm gear 54 and the worm wheel gear 56 jointly make up the speed-reducer transmitting mechanism 26.

The motor 24 includes a rotor 23, which rotates in unison with the rotational shaft 25. The angular displacement θrm (also referred to as a "motor mechanical angle") of the rotor 23 is detected as an angular displacement θr (also referred to as a "motor electrical angle") by a resolver 58 that serves as a rotor angular displacement detector. The detected angular displacement θr is supplied through a harness 92 to a rotor angular displacement detecting circuit 76 of the ECU 22 (functioning as a motor mechanical angle calculating circuit for calculating the motor mechanical angle θrm). The resolver 58 is a relative angle detecting sensor. The resolver 58 may be replaced with a rotary encoder as an absolute angle detecting sensor. The difference between the angular displacement θrm (motor mechanical angle) and the angular displacement θr (motor electrical angle) will be described later.

The ECU 22 comprises a computing machine including a microcomputer, and includes a CPU (Central Processing Unit), memories including a ROM (such as an EEPROM) and a RAM (Random Access Memory), input/output devices including an A/D converter, a D/A converter, etc., and a timer as a timing means. The CPU reads and executes programs stored in the ROM to function as various function performing sections (function performing means), e.g., a controller, a calculator, a processor, etc.

According to the present embodiment, the ECU 22 has a storage unit 78, which serves as a memory for storing various characteristics (including maps), programs, etc. The ECU 22 functions as the aforementioned torque detecting circuit 72, the steering angular velocity calculator 74 (steering angular velocity detector), and the rotor angular displacement detecting circuit 76, and also functions as an abnormality detector 80, a vehicle stop detector 82, a motor controller 84, and a timing section 85, etc.

The torque detecting circuit 72 generates a signal representative of the torque Tr (referred to as a "torque Tr" for easier understanding) from a differential signal between signals that are related to the torque Tr output through the harness 91 from the two detecting coils (not shown) of the torque sensor 20, and supplies the generated signal to the motor controller 84.

The rotor angular displacement detecting circuit 76 calculates (detects) the angular displacement (motor mechanical angle) θrm representative of the rotation of the rotor 23 of the motor 24 from the angular displacement θr (motor electrical angle) supplied from the resolver 58, and supplies the calculated angular displacement θrm to the motor controller 84 and to the steering angular velocity calculator 74.

If the steering angular velocity calculator 74 is supplied with the steering angle (also referred to as a "steering angle" or a "wheel angle" of the steering shaft 14) θs from the steering angle sensor 19 that is operating normally, the steering angular velocity calculator 74 differentiates the steering angle θs that is output from the steering angle sensor 19 through the harness 91 to generate a steering angular velocity θs' (θs'=dθs/dt, where d represents a differential operator and t represents time), and supplies the steering angular velocity θs' to the motor controller 84.

If the steering angle sensor 19 becomes abnormal or the vehicle does not include the steering angle sensor 19, then the steering angular velocity calculator 74 differentiates, with respect to time, an estimated steering angle θsc calculated from the motor mechanical angle θrm by the rotor angular displacement detecting circuit 76, based on the angular displacement θr of the resolver 58, in order to calculate an estimated steering angular velocity θsc' (θsc'=dθsc/dt, where d represents a differential operator and t represents time).

The abnormality detector 80 monitors the torque Tr output from the torque detecting circuit 72, as well as the steering angle θs output from the steering angle sensor 19. If the abnormality detector 80 detects an abnormality such as a fusing failure between the terminals of the torque sensor 20 and the harness 91, an open circuit of the harness (i.e., a disconnection of the harness 91) or a short circuit between wires in the harness 91, or an abnormality of a differential amplifier or the like in the torque detecting circuit 72, e.g., an output voltage fixed to 0 volts or an output voltage other than a voltage range from 0 volts to 5 volts, then the abnormality detector 80 supplies an abnormality detection signal Sab to the motor controller 84 and the steering angular velocity calculator 74.

The motor controller 84 and the vehicle stop detector 82 of the ECU 22 are supplied with an output signal from a vehicle speed sensor 86, which detects a vehicle speed Vs from the rotational speed of the front and rear road wheels or the transmission. That is, the motor controller 84 and the vehicle stop detector 82 of the ECU 22 are supplied with the vehicle speed Vs through a harness 94.

The vehicle stop detector 82 and the motor controller 84 of the ECU 22 also are supplied with a brake operation signal Sb from a parking brake 88 through a harness 95.

Actually, signals such as the vehicle speed Vs and the brake operation signal Sb are supplied to the ECU 22 via an intravehicular network such as a CAN (Control Area Network) or the like. Alternatively, the vehicle speed sensor 86 and the parking brake 88 may be connected to the ECU 22 by a point-to-point wiring system rather than an intravehicular network.

When the vehicle stop detector 82 detects the brake operation signal Sb from the parking brake 88, or detects the vehicle speed Vs as having fallen to zero, the vehicle stop detector 82 supplies the motor controller 84 with a vehicle stop detection signal Sstop.

For determining an assistive electric current Ia for the motor 24 that corresponds to the assistive torque Ta, the motor controller 84 refers to characteristics (to be described later), which are stored in the storage unit 78 (characteristics storage unit), based on the angular displacement (motor mechanical angle) θrm of the rotor 23, the estimated steering angle θsc, the estimated steering angular velocity θsc', the abnormality detection signal Sab, the vehicle speed Vs, and the brake operation signal Sb, as well as the torque Tr and the steering angular velocity θs'. The motor controller 84 then determines an assistive electric current Ia by executing a program, and supplies the determined assistive electric current Ia through a harness 93 to the coils in the respective phases of the stator of the motor 24.

The motor 24 generates an assistive torque Ta depending on the supplied assistive electric current Ia, and applies the generated assistive torque Ta to the output shaft 42 through the speed-reducer transmitting mechanism 26, thereby generating a steering assistive torque for the steering shaft 14.

Characteristic operations of the electric power steering apparatus 10 according to the present embodiment, which basically is constructed and operated as described above, will be described below with reference to the flowchart, etc.

First Inventive Example

Figure 3:
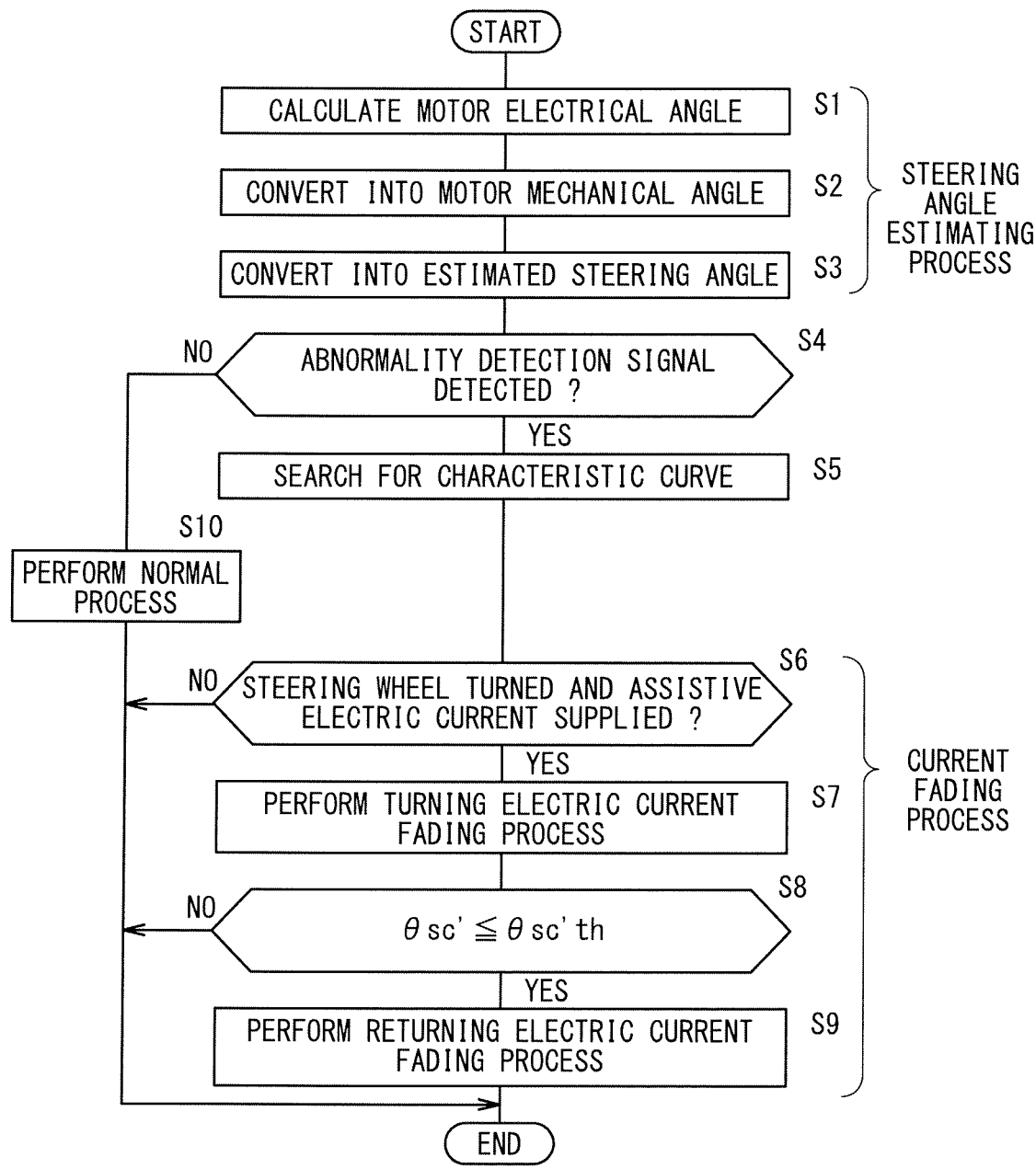
FIG. 3 is a flowchart of a steering angle estimating process and an electric current fading process.

FIG. 3 is a flowchart illustrative of an operation sequence of a first inventive example and a second inventive example. The operation sequence according to the flowchart is carried out repeatedly at given time intervals.

The ECU 22 performs a steering angle estimating process (estimated steering angle calculating process) in steps S1 through S3, irrespective of whether the torque sensor 20 and the steering angle sensor 19 are abnormal or normal.

In step S1, the rotor angular displacement detecting circuit 76 integrates the angular displacement θr (electrical angle of the rotor 23) detected by the resolver 58 in order to calculate a motor electrical angle θre.

Then, in step S2, the rotor angular displacement detecting circuit 76 multiplies the calculated motor electrical angle θre by the number of pole pairs of the resolver 58 in order to calculate a motor mechanical angle θrm, which represents the angular displacement of the rotor 23 (rotational shaft 25) (i.e., converts the motor electrical angle θre into the motor mechanical angle θrm) according to the following equation (1), and supplies the motor mechanical angle θrm to the motor controller 84 and the steering angular velocity calculator 74.

Motor mechanical angle=motor electrical angle×number of resolver pole pairs $$\theta rm = \theta re \times \text{number of resolver pole pairs} \qquad (1)$$

Then, in step S3, the motor controller 84 and/or the rotor angular displacement detecting circuit 76 converts the calculated motor mechanical angle θrm into a steering angle (estimated steering angle) θsc of the steering shaft 14 according to the following equation (2).

Estimated steering angle=motor mechanical angle× (ratio of the rotational shaft of the motor 24 and the rotational shaft of the steering system 18)=motor mechanical angle×speed reduction ratio of the speed-reducer transmitting mechanism 26

$$\theta sc = \theta rm \times \text{speed reduction ratio of the speed-reducer transmitting mechanism 26} \qquad (2)$$

The speed reduction ratio of the speed-reducer transmitting mechanism 26 is set to a value of 1/20 in the present embodiment. More specifically, according to the present embodiment, a motor mechanical angle θsm of 360 [deg] is converted into an estimated steering angle θsc of 18 (=360/20) [deg], which is an estimate of the rotation of the steering wheel 12 (output shaft 42). Similarly, the motor rotational speed N, e.g., N=2 [rps], which represents the rotational speed per second of the rotor 23 of the motor 24, corresponds to the rotational speed (estimated steering rotational speed) Nsc=0.1 (=2/20) [rps] of the steering wheel 12 (output shaft 42).

The estimated steering rotational speed Nsc=0.1 [rps] of the steering wheel 12 (output shaft 42) corresponds to an estimated steering angular velocity θsc'=36(0.1 [rps]×360 [deg]) [deg/s]. Therefore, a one-to-one correspondence exists between the motor rotational speed N and the estimated steering angular velocity (rotational angular velocity) θsc'. For example, a motor rotational speed N=2 [rps] corresponds to an estimated steering angular velocity θsc'=36[deg/s].

The motor rotational speed N and the estimated steering rotational speed Nsc are calculated by the motor controller 84.

As shown in FIG. 1, when the output shaft 42 rotates in unison with the steering shaft 14, which is fixed to the steering wheel 12, the worm wheel gear 56, which is coaxially secured to the output shaft 42, rotates in unison therewith. The worm gear 54 is rotated, thereby rotating the rotational shaft 25 (rotor 23) of the motor 24 that is fixed to the worm gear 54 in unison therewith. Rotation of the rotor 23 is detected by the resolver 58. As a result, it is possible to calculate (detect) an estimated steering angle θsc, which estimates the steering angle θs and is representative of the angular displacement of the steering wheel 12, based on the angular displacement θr detected by the resolver 58.

The steering angle θs and the estimated steering angle θsc become positive when the steering wheel 12 is rotated to the right, and become negative when the steering wheel 12 is rotated to the left. For making a right turn while the vehicle travels in a straight direction (θs=θsc=0 [deg]), the driver rotates the steering wheel 12 to the right, thereby turning the steering wheel 12, and thereafter rotates the steering wheel 12 to the left, thereby returning the steering wheel 12 to a neutral position, so that the vehicle is steered back to travel in a straight direction. Therefore, when the driver makes a right turn while the vehicle travels in a straight direction and then steers back the vehicle to travel in a straight direction, basically, rotating the steering wheel 12 to the right implies turning the steering wheel 12, whereas rotating the steering wheel 12 to the left implies returning the steering wheel 12 to the neutral position.

For making a left turn while the vehicle travels in a straight direction (θs=θsc=0 [deg]), the driver first rotates the steering wheel 12 to the left, thereby turning the steering wheel 12, and thereafter rotates the steering wheel 12 to the right, thereby returning the steering wheel 12, so that the vehicle is steered back to travel in a straight direction. Therefore, when the driver makes a left turn while the vehicle travels in a straight direction and then steers the vehicle back to travel in a straight direction, basically rotating the steering wheel 12 to the left implies turning the steering wheel 12, and rotating the steering wheel 12 to the right implies returning the steering wheel 12 to the neutral position.

When the steering wheel 12 is rotated to the right while the vehicle travels in a straight direction (the steering wheel 12 is neutral), the steering angle θs (estimated steering angle θsc) is of a positive value. Further, when the steering wheel 12 is rotated to the left while the vehicle travels in a straight direction (the steering wheel 12 is neutral), the steering angle θs (estimated steering angle θsc) is of a negative value. Since the presence of positive and negative signs tends to make the consideration of the magnitude of angles complex, unless otherwise noted, in the example below, a case shall be described in which the driver makes a right turn while the vehicle travels in a straight direction and then the driver steers the vehicle back to travel in a straight direction (the first quadrant of a coordinate system representing steering assistive characteristics). In such an example, the steering angle θs and the estimated steering angle θsc are both positive.

According to the processes of steps S1 through S3, even if the steering angle sensor 19 and the torque sensor 20 become abnormal, the rotor angular displacement detecting circuit 76, the steering angular velocity calculator 74, and the motor controller 84 can determine an estimated steering angle θsc [deg], which estimates the steering angle θs [deg], and an estimated steering angular velocity θsc' [deg/s] based on the angular displacement θr detected by the resolver 58.

The steering assistive force, which is applied to the steering wheel 12 by energizing the motor 24, may basically be imposed in a direction in which the steering angle θs or the estimated steering angle θsc changes.

Then, in step S4, the motor controller 84 detects whether or not an abnormality detection signal Sab from the abnormality detector 80 has been supplied. If the motor controller 84 detects an abnormality detection signal Sab concerning the torque sensor 20 and the steering angle sensor 19 in step S4, then the motor controller 84 carries out the processing sequence from step S5. In the event of an open circuit or a short circuit of the harness 91, the torque sensor 20, which as shown in FIG. 1 houses the steering angle sensor 19 therein, is likely to suffer a power cutoff, thereby making the output signals from the steering angle sensor 19 and the torque sensor 20 go abnormal simultaneously.

If the motor controller 84 does not detect an abnormality signal Sab in step S4, then a normal process (normal-mode assistive process) is carried out in step S10. During the normal process, since the torque sensor 20 and the steering angle sensor 19 are normal, the steering assistive force is applied as described previously.

Figure 4A:
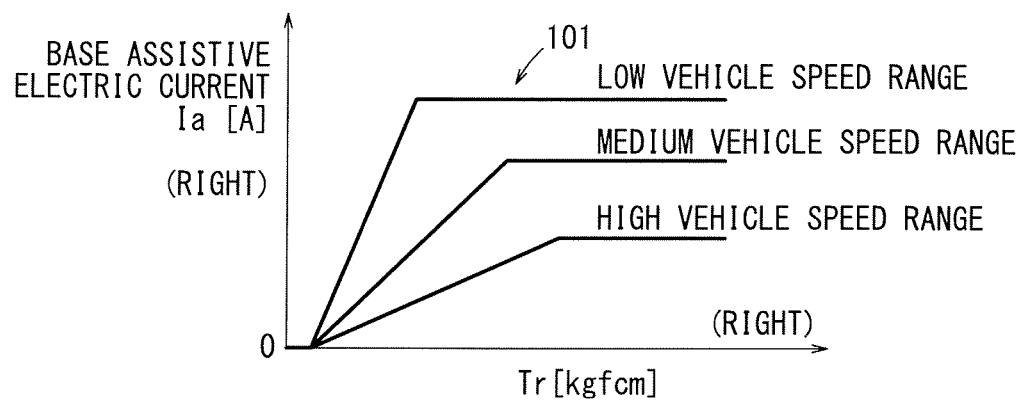
FIG. 4A is a diagram illustrative of base assistive current characteristics referred to in a normal-mode assistive process.

More specifically, the motor controller 84 refers to (searches for) a characteristic curve (also referred to as a "base assistive electric current characteristic curve" or a "base assistive characteristic curve") 101 stored in the storage unit 78, which as shown in FIG. 4A, represents a base assistive electric current Ia [A] versus a steering torque Tr [kgfcm] with respect to a parameter representative of the vehicle speed Vs, and basically, the motor controller 84 calculates a base assistive electric current Ia, which increases as the vehicle speed Vs becomes lower. Then, the motor controller 84 energizes the motor 24 with the calculated base assistive electric current Ia.

If the motor controller 84 detects an abnormality signal Sab indicating that the torque sensor 20 or the like is abnormal in step S4, then an abnormal-mode assistive process is carried out in step S5.

Figure 4B:
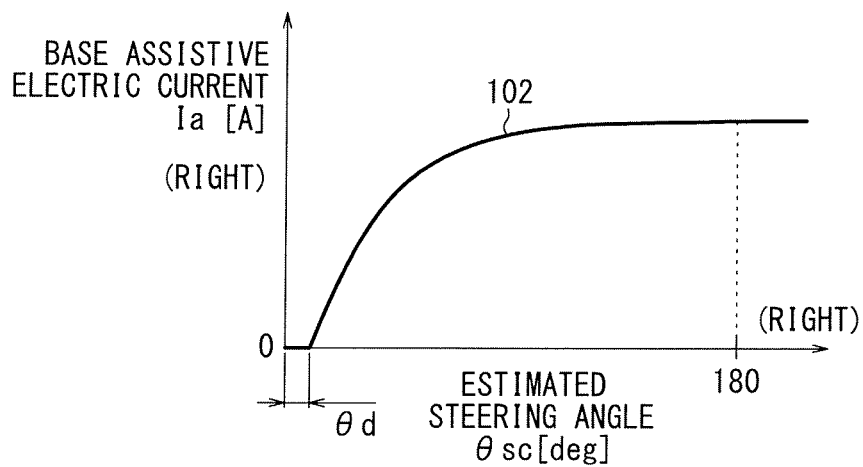
FIG. 4B is a diagram illustrative of base assistive current characteristics referred to in an abnormal-mode assistive process.

In step S5, the motor controller 84 refers to (searches for) a characteristic curve (also referred to as a "base assistive electric current characteristic curve" or a "base assistive characteristic curve") 102 representing a base assistive electric current Ia [A] versus the steering angle θsc, as shown in FIG. 4B, which is stored in the storage unit 78. The motor controller 84 calculates a base assistive electric current Ia and then energizes the motor 24 with the calculated base assistive electric current Ia.

The base assistive electric current characteristic curve 102 may be stored as a map in the storage unit 78, or may be stored as a calculating formula in the storage unit 78. If the base assistive electric current characteristic curve 102 is to be stored as a map of discrete values in the storage unit 78, then values between such discrete values should preferably be determined according to an interpolating process.

As shown in FIG. 4B, when the steering angle θsc [deg] is in the vicinity of a neutral position in a range from 0 [deg] to a dead-zone steering angle θd [deg] (which ranges from 0 to 10 [deg], but is set to 10 [deg] in the present embodiment), the base assistive electric current characteristic curve 102 represents a base assistive current Ia=0 [A] (no assistive current Ia is supplied). When the steering angle θsc [deg] is equal to or greater than the dead-zone steering angle θd [deg], the base assistive electric current characteristic curve 102 represents an assistive current that increases as the steering angle θsc becomes greater, i.e., which increases substantially in proportion to the steering angle θsc. When the steering angle θsc is much greater, the base assistive electric current characteristic curve 102 represents a base assistive current Ia that increases at a reduced rate. When the steering angle θsc is near to or greater than 180 [deg], the base assistive electric current characteristic curve 102 represents a base assistive current Ia that is of a constant value, i.e., which is of a saturated value.

The processing sequence from step S1 to step S5 represents an operation sequence according to the first inventive example. The electric power steering apparatus 10 according to the first inventive example includes the torque sensor 20 as a torque detector for detecting a torque Tr generated in the steering system 18, the motor 24 for applying an assistive torque to the output shaft 42, which serves as a rotational shaft of the steering system 18, the resolver 58 as a rotor angular displacement detector for detecting an angular displacement ↓r of the rotor 23 of the motor 24, and the motor controller 84 for controlling an electric current for energizing the motor 24 based on the torque Tr detected by the torque sensor 20 (step S10), wherein the electric power steering apparatus 10 is characterized by an abnormality detector 80 for detecting whether or not the torque sensor 20 and the torque detecting circuit 72 have become abnormal. The abnormality detector 80 detects an abnormality of the torque sensor 20 or the torque detecting circuit 72, and the motor controller 84 calculates an estimated steering angle θsc based on a motor electrical angle θre, which represents an integrated value of the angular displacement θr detected by the resolver 58, calculates a base assistive electric current Ia [A] by referring to the characteristic curve 102 representing the base assistive electric current Ia [A] versus the estimated steering angle θsc, and energizes the motor 24 with the calculated base assistive electric current Ia [A].

Even in the event of an abnormality condition in which the torque sensor 20 or the torque detecting circuit 72 is detected as being abnormal based on the abnormality detection signal Sab and the torque sensor 20 fails to detect the steering torque Tr, a steering assistive control process is carried out in order to supply the assistive electric current Ia based on the base assistive electric current characteristic curve 102, so as to energize the motor 24 for thereby applying a steering assistive force to the steering wheel 12. However, the steering assistive control process is a tentative assistive process, which only takes place in the event of an abnormality, and has various limitations as will be described later.

When the torque sensor 20 is normal, and the output signal from the torque sensor 20 is essentially zero, and the value of the vehicle speed Vs detected by the vehicle speed sensor 86 represents a substantially constant speed for a prescribed period of time, a midpoint (neutral) correcting process is carried out in order to update the stored value of the estimated steering angle θsc corresponding to the angular displacement θr output from the resolver 58 as zero (0 [deg]).

Since the steering assistive force, which is generated using the rotor angular displacement detecting circuit 76, is applied according to a tentative steering assistive process, when the abnormality detector 80 detects an abnormality of the torque sensor 20 or the like, the tentative steering assistive process based on the abnormality is indicated to the operator (driver) by way of a speech or visual signal. The operator (driver) can drive the vehicle to a safe place while the assistive force is generated by the tentative electric power steering process based on the angular displacement θr of the rotor 23 of the motor 24.

The assistive force generated by the tentative electric power steering process has various limitations compared with the normal-mode assistive process performed in step S21 in which the torque sensor 20 or the like is normal.

Second Inventive Example

An electric current fading process, which takes place in steps S6 through S9, will be described below as representative of one of such limitations.

Figure 5:
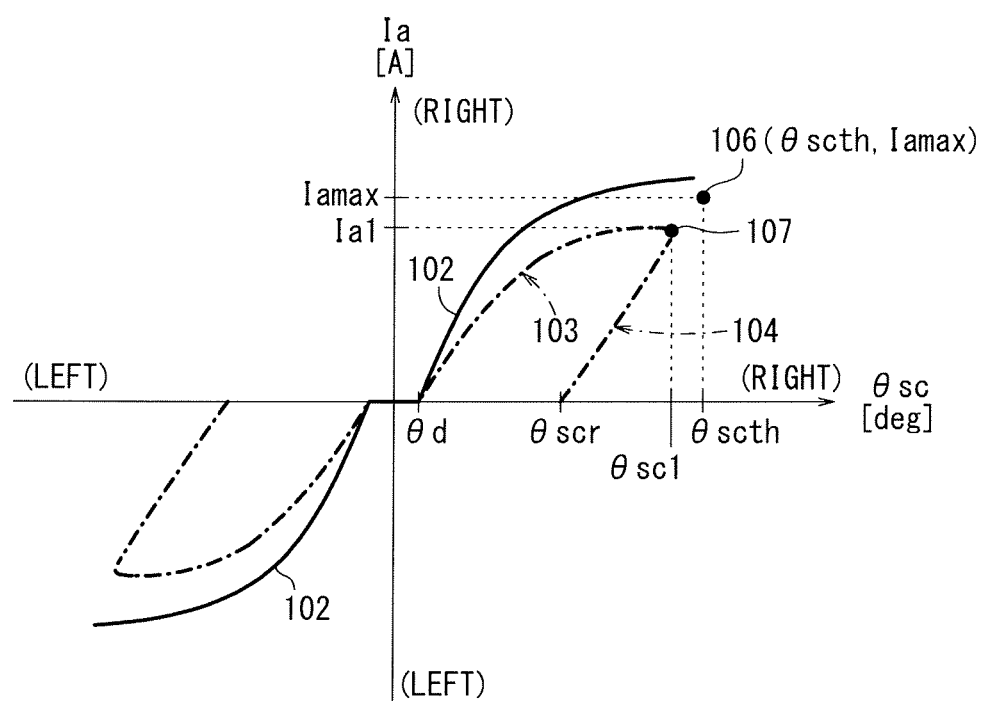
FIG. 5 is a diagram illustrative of electric current fading characteristics.

FIG. 5 shows a turning electric current fading characteristic curve (also referred to as a "turning-mode electric current fading characteristic curve") 103 and a returning electric current fading characteristic curve (also referred to as a "returning-mode electric current fading characteristic curve") 104, which are stored in the storage unit 78 for use in the electric current fading process. FIG. 5 also shows part of the base assistive electric current characteristic curve 102 shown in FIG. 4B. For facilitating understanding of the second inventive example, the characteristic curves in the first quadrant shown in FIG. 5 (characteristic curves along a rightward turning direction from 0 [deg] toward positive greater values along the horizontal axis and along a leftward returning direction from positive greater values toward positive smaller values near 0 [deg] along the horizontal axis) will be described below.

In step S6 shown in FIG. 3, it is judged whether or not the assistive electric current Ia is supplied and the steering wheel 12 is being turned based on the estimated steering angular velocity θsc', which is defined as the derivative of the estimated steering angle θsc. The estimated steering angular velocity θsc' is calculated by the steering angular velocity calculator 74 or the motor controller 84.

If the estimated steering angular velocity θsc' is positive (θsc'>0), it is decided that the steering wheel 12 is being turned. An assistive electric current Ia is determined according to the turning electric current fading characteristic curve 103, and the motor 24 is energized by the determined assistive electric current Ia.

In FIG. 5, the assistive quantity of the turning electric current fading characteristic curve 103, which is indicated as a dot-and-dash-line curve (assistive electric current Ia), is smaller than the base assistive electric current characteristic curve 102, which is indicated as a solid-line curve, at the same estimated steering angle θsc, in order to prevent the steering wheel 12 from being turned excessively. While the driver continuously turns the steering wheel 12 in one direction, the motor controller 84 measures a time from the start of turning of the steering wheel 12 (referred to as a "continuous steering time tr" in one direction) with the timing section 85, and calculates a ratio (referred to as a "continuous steering reduction ratio" or a "continuous steering reduction proportion"), where Rc is a value ranging from 1 (no reduction) to 0 (zero assistive electric current Ia), by referring to the continuous steering time reduction characteristic curve 105 shown in FIG. 6.

If the vehicle is detected as being continuously steered, then the assistive current Ia calculated based on the estimated steering angle Esc from the base assistive electric current characteristic curve 102 is multiplied by the continuous steering reduction ratio Rc corresponding to the continuous steering time tr, thereby generating a faded (reduced) assistive electric current Ia according to the following equation (3).

$$Ia \leftarrow Ia \times Rc \quad (3)$$

Ia on the right side of equation (3) represents the base assistive electric current on the base assistive electric current characteristic curve 102, and Ia on the left side of equation (3) represents the faded (reduced) assistive electric current Ia based on the turning electric current fading characteristic curve 103.

Figure 6:
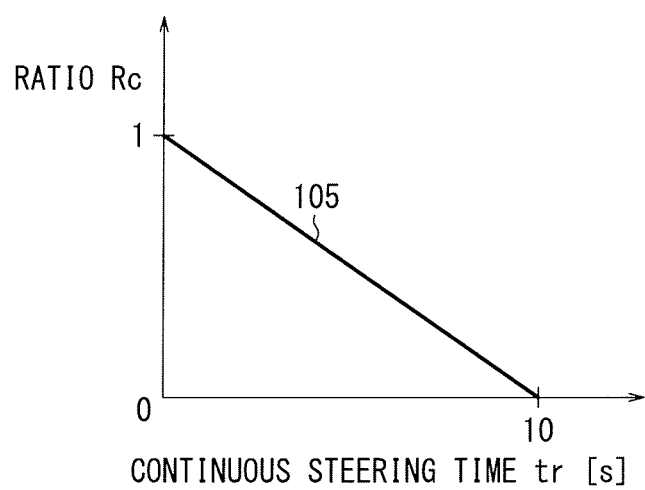
FIG. 6 is a diagram illustrative of continuous steering time reducing characteristics.

The continuous steering reduction ratio Rc represented by the continuous steering time reduction characteristic curve 105 shown in FIG. 6 is defined so that the assistive electric current Ia is reduced by 10% in one second (1 [s]). Therefore, if the steering wheel 12 is detected as being continuously turned in one direction for 10 [s] or more, then the assistive electric current Ia becomes zero.

Therefore, in step S7, if the steering wheel 12 is continuously turned in one direction during the turning electric current fading process, then the steering wheel 12 is assisted according to the turning electric current fading characteristic curve 103, the assistive quantity (assistive electric current Ia) of which is smaller than the base assistive electric current characteristic curve 102.

In order to prevent excessive assistive electric current from being supplied when the steering wheel 12 is turned, the assistive electric current Ia is limited to a maximum allowable assistive electric current Iamax {refer to the coordinate point 106 (θscth, Iamax) in FIG. 6} when the estimated steering angle θsc is of a value equal to or greater than a threshold steering angle θscth.

In step S8, it is judged whether or not an absolute value of the estimated steering angular velocity θsc' (θsc'=dθsc/dt) is of a value equal to or smaller than a substantially zero value (θsc'≈0 [deg/s]), or in the second inventive example, a threshold steering angular velocity θsc'th=7.2 [deg/s] (a steering rotational speed Nse=0.02 [rps] converted therefrom, or a motor rotational speed N=0.4 [rps] converted therefrom), for example (θsc'≤θsc'th=7.2). If the answer to step S8 is affirmative, then the returning electric current fading process in step S9 is carried out in order to encourage the returning motion of the steering wheel 12 when the steering wheel 12 is returned.

While the returning electric current fading process in step S9 is carried out, an assistive electric current Ia is determined according to a returning electric current fading characteristic curve 104, as shown in FIG. 5, and the motor 24 is energized with the calculated assistive electric current Ia.

According to the returning electric current fading characteristic curve 104, the assistive electric current Ia (Ia=Ia1 in FIG. 5) is gradually (e.g., proportionally and automatically) reduced from an assistive electric current Ia=Ia1 {coordinate point 107 (θsc1, Ia1)} at the estimated steering angle θsc=θsc1 when the estimated steering angular velocity θsc' is of a value equal to or smaller than the threshold steering angular velocity θsc'th, to zero during the time of about one second as measured by the timing section 85. At this time, according to the returning electric current fading characteristic curve 104, the estimated steering angle θsc is returned to the left due to a SAT (Self Aligning Torque), which is a force that acts on the vehicle while the vehicle is in motion, and which returns the steering wheel 12 (steering system 18) to a straight-traveling direction (neutral position).

According to the second inventive example, the electric power steering apparatus 10 also includes the steering angular velocity calculator 74 or the motor controller 84 for calculating an estimated steering angular velocity θsc' of the output shaft 42, which serves as the rotational shaft of the steering system 18. When the steering wheel 12 is returned, the motor controller 84 fades (limits) the assistive electric current Ia that energizes the motor 24 according to the returning electric current fading characteristic curve 104 {the gradient of which changes depending on the load (front-axle load of the vehicle), the vehicle speed Vs, and road conditions for each individual vehicle}, at the time that the absolute value of the estimated steering angular velocity θsc' calculated by the steering angular velocity calculator 74 is in the vicinity of zero (for example, the threshold steering angular velocity θsc'th=7.2 [deg/s]), thereby preventing excessive assistive electric current from being supplied.

In the event that the steering angle sensor 19 combined with the torque sensor 20, or a steering angle sensor provided independently of the torque sensor 20, is operating normally, the steering angle θs output from the steering angle sensor 19 or the independent steering angle sensor may be differentiated thereby to calculate the steering angular velocity θs' in order to carry out the electric current fading process.

Third Inventive Example, Fourth Inventive Example

A vehicle speed ratio correcting process according to a third inventive example, and a vehicle speed electric current limiting process according to a fourth inventive example, for correcting the base assistive electric current Ia will be described below with reference to the flowchart shown in FIG. 7.

As the vehicle speed becomes higher, the SAT increases, and the assistive electric current must be increased in a medium-vehicle-speed range and a high-vehicle-speed range, as compared with the low-vehicle-speed range.

Therefore, it is preferable that the base assistive electric current characteristic curve 102 shown in FIG. 4B is changed (corrected) depending on the vehicle speed Vs.

Figure 8:
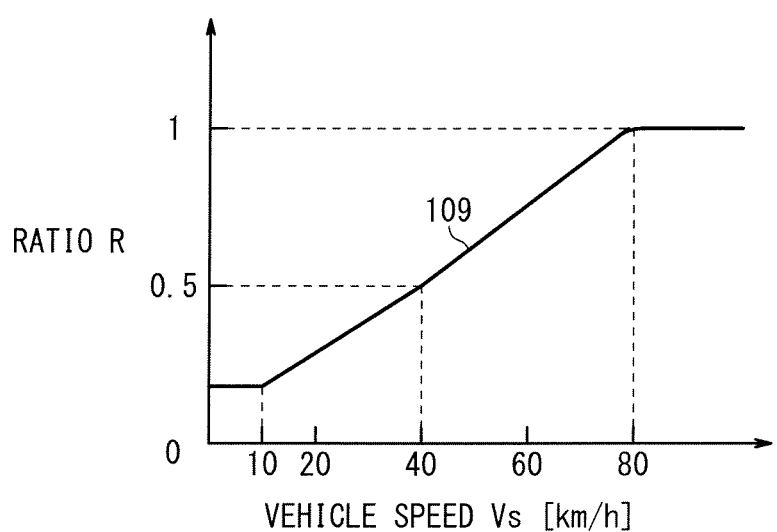
FIG. 8 is a diagram illustrative of vehicle speed ratio characteristics.

FIG. 8 shows a vehicle speed ratio characteristic curve 109, which is stored in the storage unit 78, for correcting the base assistive electric current characteristic curve 102 depending on the vehicle speed Vs. In the present embodiment, a ratio R represented by the vehicle speed ratio characteristic curve 109 is set to R≈0.5 when the vehicle speed Vs is Vs=40 [km/h], and is set to R≈1 when the vehicle speed Vs is Vs=80 [km/h], and between which the ratio R increases in proportion to the vehicle speed Vs. When the vehicle speed Vs becomes equal to or higher than Vs=80 [km/h], the ratio R is fixed to R≈1. When the vehicle speed Vs becomes equal to or lower than Vs=10 [km/h], the ratio R is fixed to R≈0.2.

An assistive electric current Ias, which is corrected depending on the vehicle speed Vs, is determined according to the following equation (4).

$$Ias = \text{base assistive electric current} \times \text{ratio} = Ia \times R \quad (4)$$

As described above, in comparison with the low-vehicle-speed range, the assistive electric current must be increased in the medium-vehicle-speed and high-vehicle-speed ranges. However, in view of the fact that the steerable angular range becomes smaller as the vehicle speed Vs becomes higher, and the steering assistive force is controlled based on the angular displacement θr of the resolver 58 in order to prevent excessive electric currents, it has been found that it is preferable to establish an electric current limiting value Imax, which defines a maximum value (limitative value) for the assistive electric current at each value of the vehicle speed Vs.

Figure 9:
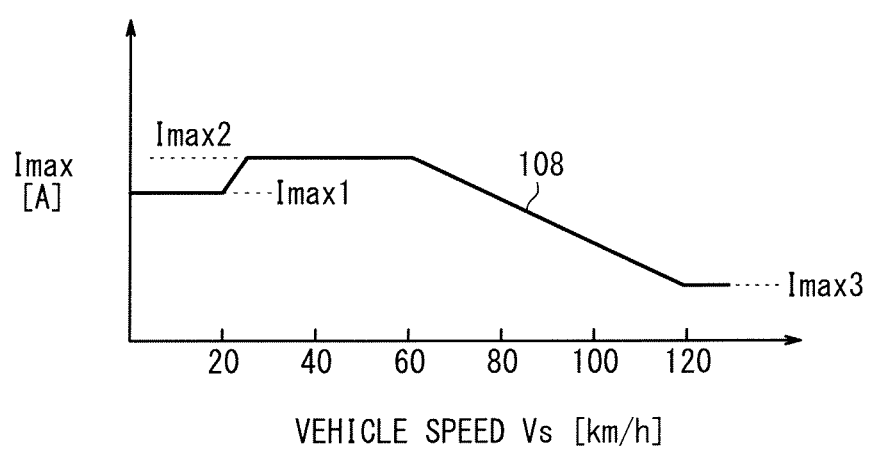
FIG. 9 is a diagram illustrative of vehicle speed electric current limiting characteristics.

FIG. 9 shows a vehicle speed electric current limiting characteristic curve 108, which is stored in the storage unit 78. According to the vehicle speed electric current limiting characteristic curve 108, it has been found that the electric current limiting value Imax should preferably be set to a first constant value Imax1 within a vehicle speed range Vs=0 to 20 [km/h], and gradually increase within a vehicle speed range Vs=20 to 30 [km/h], and be set to a second constant value Imax2 within a vehicle speed range Vs=30 to 60 [km/h], and gradually decrease within a vehicle speed range Vs=60 to 120 [km/h], and be set to a third constant value Imax3 within a vehicle speed range Vs of 120 [km/h] or higher (Imax 3<Imax 1<Imax 2).

Figure 7:
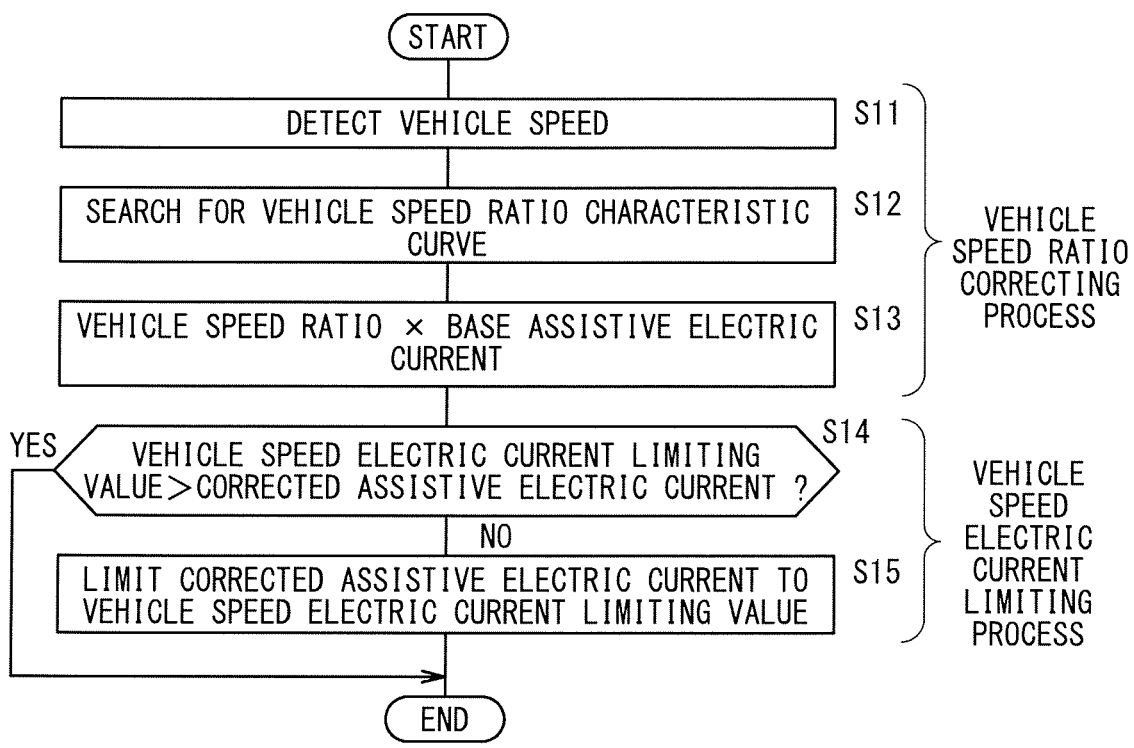
FIG. 7 is a flowchart of a vehicle speed ratio corrective process and a vehicle speed current limiting process.

According to the flowchart shown in FIG. 7, after step S5 but before step S6, a process of correcting the base assistive electric current Ia according to the third inventive example is carried out.

After the vehicle speed Vs is detected by the vehicle speed sensor 86 in step S11, in step S12, the vehicle speed ratio characteristic curve 109 shown in FIG. 8 is searched for (referred to), and the base assistive electric current Ia shown in FIG. 4B is multiplied by the ratio R according to equation (4), thereby calculating an assistive electric current Ia corrected depending on the vehicle speed Vs.

Figure 10:
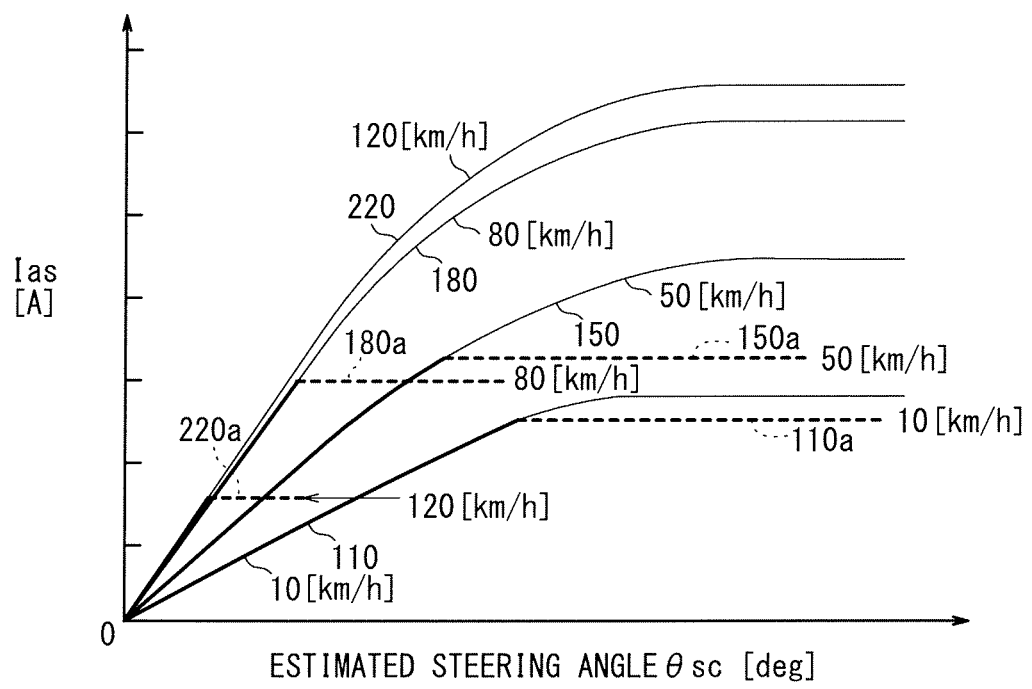
FIG. 10 is a diagram illustrative of an assistive electric current corrective process.

In FIG. 10, solid-line characteristic curves 110, 150, 180, 220 are representative of respective assistive electric currents Ias, which are corrected depending on the vehicle speed Vs when the vehicle speed Vs is 10 [km/h], 50 [km/h], 80 [km/h], and 120 [km/h], respectively, for example.

According to the third inventive example, the electric power steering apparatus 10 includes the storage unit 78, which stores in advance the characteristic curve (base assistive electric current characteristic curve 102) defining the relationship between the estimated steering angle θsc determined from the angular displacement θr of the rotor 23 and the assistive electric current for energizing the motor 24, and the vehicle speed ratio characteristic curve 109, and the vehicle speed sensor 86, which functions as a vehicle speed detector that detects the vehicle speed Vs of a vehicle incorporating the electric power steering apparatus 10 therein. When the abnormality detector 80 detects an abnormality of the torque sensor 20 or the like, the motor controller 84 obtains a base assistive electric current Ia for energizing the motor 24 by referring to the characteristic curve 102 stored in the storage unit 78, and based on the estimated steering angle θsc that is calculated based on the angular displacement θr of the rotor 23, which is detected by the resolver 58 as the rotor angular displacement detector. The motor controller 84 then corrects the base assistive electric current Ia based on the vehicle speed Vs detected by the vehicle speed sensor 86, thereby producing an assistive electric current Ias for energizing the motor 24, which has been corrected depending on the vehicle speed Vs. Accordingly, a steering assistive force can be applied within an entire vehicle speed range in which the steering assistive force is required.

Operations of the Fourth Inventive Example

In step S14, it is judged whether or not the value of the assistive electric current Ias corrected depending on the vehicle speed Vs, which was determined in step S13, is greater than the electric current limiting value Imax (Imax1, Imax2, Imax3) determined according to the vehicle speed electric current limiting characteristic curve 108 shown in FIG. 9 at the vehicle speed Vs. If Ias>Imax, then in step S15, the assistive electric current Ias is limited to the electric current limiting value Imax corresponding to the vehicle speed Vs. If Ias≤Imax, then the assistive electric current Ias is used as is.

In FIG. 10, the solid-line characteristic curves 110, 150, 180, 220 represent respective electric currents in view of the ratio R, and the dotted-line characteristic curves 110a, 150a, 180a, 220a represent respective electric currents in view of the electric current limiting value Imax.

According to the fourth inventive example, as described above, since the storage unit 78 stores the electric current limiting value Imax depending on the vehicle speed Vs as the characteristic curve 108, excessive output power is reduced, and characteristic curves are obtained, which cannot be established solely by a vehicle-speed-related control process based on the ratio A shown in FIG. 8.

MODIFICATIONS

When the vehicle stop detector 82 detects either a vehicle speed Vs=0 from the vehicle speed sensor 86 or the brake operation signal Sb from the parking brake 88, the vehicle stop detector 82 supplies a vehicle stop detection signal Sstop to the motor controller 84. At this time, the motor controller 84 sets the assistive electric current Ia to zero, so that unnecessary steering assistive forces will not be applied. According to such a modification, if the parking brake 88 is released while the drive road wheels are rotated by the engine or the like, such as when the vehicle is lifted up in a service shop or the like, the assistive electric current Ia is not supplied when the vehicle speed Vs detected by the vehicle speed sensor 86 is Vs=0.

According to the present embodiment, as described above, even if the torque sensor 20 fails and is unable to detect the steering torque Tr, the steering angle θs is estimated using the angular displacement θr of the rotor 23, which is detected by the resolver 58 combined with the motor 24, and the steering angular velocity θs' also is estimated. Then, a steering assistive force generated by the motor 24 is applied based on the estimated steering angle θsc and/or the estimated steering angular velocity θsc'.

The present invention is not limited to the above embodiment, but various alternative arrangements may be provided therein based on the disclosure of the present description.

The invention claimed is:

1. An electric power steering apparatus including:
   a torque detector for detecting a torque generated in a steering system;
   a motor for applying an assistive torque to a rotational shaft of the steering system;
   a steering angular velocity detector for detecting an angular velocity of the rotational shaft of the steering system;
   a rotor angular displacement detector for detecting an angular displacement of a rotor of the motor; and
   a motor controller for controlling an electric current for energizing the motor based on the torque detected by the torque detector,
   wherein the electric power steering apparatus is characterized by an abnormality detector for detecting whether or not the torque detector has become abnormal,
   if the abnormality detector detects an abnormality of the torque detector, the motor controller controls the electric current for energizing the motor based on the angular displacement of the rotor detected by the rotor angular displacement detector, and
   wherein the motor controller limits the electric current for energizing the motor when an absolute value of a steering angular velocity detected by the steering angular velocity detector is in the vicinity of zero at a time that a steering wheel is turned.

2. The electric power steering apparatus according to claim 1, further comprising:
   a storage unit, which stores in advance a characteristic curve representative of a relationship between the angular displacement of the rotor and the electric current for energizing the motor; and
   a vehicle speed detector for detecting a vehicle speed of a vehicle that incorporates the electric power steering apparatus,
   wherein when the abnormality detector detects an abnormality of the torque detector, the motor controller obtains the electric current for energizing the motor by referring to the characteristic curve stored in the storage unit, based on the angular displacement of the rotor detected by the rotor angular displacement detector, and corrects the electric current with the vehicle speed detected by the vehicle speed detector, to thereby generate a corrected electric current for energizing the motor.

3. The electric power steering apparatus according to claim 2, wherein the storage unit further stores an electric current limiting value depending on the vehicle speed.

4. The electric power steering apparatus according to claim 1, wherein the steering angular velocity detector detects the angular velocity of the rotational shaft of the steering system based on an angular velocity of the rotor.

5. The electric power steering apparatus according to claim 1, further comprising:
   a vehicle stop detector for detecting that a vehicle, which incorporates the electric power steering apparatus therein, stops,
   wherein the motor controller sets the electric current for energizing the motor to zero when the vehicle stop detector detects that the vehicle has stopped.

* * * * *